(12) United States Patent
Goldstein

(10) Patent No.: US 6,510,005 B1
(45) Date of Patent: Jan. 21, 2003

(54) FILTER FOR ILLUSION APPARATUS

(76) Inventor: Irving S. Goldstein, 170 Tenth St., Providence, RI (US) 02940

(*) Notice: Subject to any disclaimer, the term of this patent is extended or adjusted under 35 U.S.C. 154(b) by 0 days.

(21) Appl. No.: 09/422,651

(22) Filed: Oct. 22, 1999

Related U.S. Application Data

(60) Provisional application No. 60/105,723, filed on Oct. 27, 1998.

(51) Int. Cl.⁷ .............................................. G02B 27/00
(52) U.S. Cl. ....................... 359/614; 359/608; 359/613; 359/603; 359/884
(58) Field of Search ................... 359/614, 608, 359/613, 603, 884, 586, 587, 588, 451; 348/781, 782, 783, 786

(56) References Cited

U.S. PATENT DOCUMENTS

| | | | | |
|---|---|---|---|---|
| RE28,634 E | * | 12/1975 | DePalma | 350/126 |
| 4,478,902 A | * | 10/1984 | Tsuzuku et al. | 359/443 |
| 4,642,514 A | * | 2/1987 | English et al. | 313/111 |
| 4,837,478 A | * | 6/1989 | Anzai et al. | 313/112 |
| 5,135,298 A | * | 8/1992 | Feltman | 351/163 |
| 5,361,163 A | * | 11/1994 | Matsuda et al. | 264/1.9 |
| 5,365,378 A | * | 11/1994 | Sorko-Ram | 359/838 |
| 5,459,017 A | * | 10/1995 | Topel, Jr. et al. | 430/269 |
| 5,485,226 A | * | 1/1996 | Chipperfield | 348/782 |
| 5,619,254 A | * | 4/1997 | McNelley | 348/14.08 |
| 6,097,543 A | * | 8/2000 | Rallison et al. | 359/633 |
| 6,143,418 A | * | 11/2000 | Takamiya et al. | 428/434 |
| 6,162,844 A | * | 12/2000 | Lally et al. | 523/106 |

* cited by examiner

Primary Examiner—Mohammad Sikder

(57) ABSTRACT

A partially transparent, partially reflective curved screen is formed with a thin metal layer supported on a transparent supporting layer. A transparent light absorbing dye or other means for optically absorbing visible light is incorporated in the transparent supporting layer. The screen allows an optical image such as from a TV to be transmitted therethrough with reduced ghost effect.

7 Claims, 1 Drawing Sheet

FILTER FOR ILLUSION APPARATUS

CROSS REFERENCE TO RELATE APPLICATION

This application claims priority from Provisional Application No. 60/105,723 filed Oct. 27, 1998.

BACKGROUND OF THE INVENTION

1. Field of the Invention

This invention disclosure relates to an improvement of an illusion apparatus of the type which utilizes a curved screen in the nature of a partially reflective partially transparent convex mirror, in front of a television set. Such illusion apparatus is the subject of U.S. Pat. Nos. 4,971,312 and 5,681,223.

2. Discussion of Problems To Be Solved and Prior Art

The patented devices allow a television image or any optical monitor to be viewed simultaneously with the reflected image of a person viewing the television. The devices may utilize a curved screen which consists of a thin metal layer and a clear supporting layer. The thin metal layer can either be deposited directly on the supporting layer or can consist of a thin metal layer deposited on a thin plastic web which is laminated to the supporting layer. The metal layer is made thin enough so that it is partially transparent and, therefore both a transmitted image from the television screen and a reflected image of the viewer are produced simultaneously. The amount of transmission in the metal layer (determined by its thickness) allows the relative brightness of the transmitted image and the reflected image to be adjusted. The curvature of the screen allows the relative size of the reflected image to be adjusted by moving the viewer closer or farther from the screen (larger or smaller reflected image, respectively). Typically, the reflected image is thus adjusted so that its size is equal to apparent size of the transmitted television image to the viewer. The overall situation is shown in FIG. 1.

T0 and T1 are the intensities of the original and transmitted television image, respectively and U0 and R1 are the intensities of the original and reflected viewer image, respectively. The television image is typically a person whom the viewer is attempting to visually emulate.

This original patented device has two potential difficulties which the current invention helps to eliminate or minimize. The first of these difficulties (the ghost effect) is that there is a ghost image produced of the original television image. It is due to multiple reflections of the original television image, T0, between the concave side of the metal layer of the curved screen and the front surface of the television tube (and possibly between the concave side of the metal layer and the concave side of the supporting layer). This ghost image is shown schematically in the diagram of FIG. 2 and is represented by T2. Although this image is less intense than the transmitted image, T1, it is still noticeable since it has a slight geometric offset from T1 and is distorted by the curvature of the screen. At best, the net effect will be an apparent blurring of the transmitted image.

According to U.S. Pat. No. 4,971,312, the screen (mirror) should be thin to minimize secondary reflections. However, the absorbing layer will also minimize these secondary reflections so that thicker and therefore sturdier screens are possible.

The second difficulty (the heating effect) occurs when the screen is separated from the television set or monitor and the concave side of the screen is exposed to a strong (at least partially collimated) source, S0, of optical radiation (such as the sun). Under these conditions the screen acts as a concentrator and can produce a high intensity reduced image of the strong source which could heat an item on which it impinges (hot enough to ignite the item). This concentrated image is shown as S1 on FIG. 2 (it can only form in the absence of the TV set or monitor). This concentrated image will always form when the concave side of the screen is exposed to a strong collimated light source.

SUMMARY OF THE INVENTION

The present invention addresses both of these difficulties by fabricating the supporting layer with some optical absorption. The invention is applicable to all embodiments (e.g., thin metal layer deposited on the supporting layer; thin plastic web laminated to the supporting layer) of the mirrors described in the aforementioned U.S. Pat. Nos. 4,971,312 and 5,681,223, in which the ghosting or heating effects appear. For example, in the case where the reflectivity is integral to the surface of the screen, rather than due to a metal coating, the ghosting effect is still a problem which may be caused by the geometry of the screen, and thus may be solved or ameliorated by the present invention. The disclosures of these patents are incorporated herein in their entireties, by reference thereto.

The invention will now be described in greater detail and by way of specific embodiments and with the assistance of the accompanying drawings in which:

DETAILED DESCRIPTION AND PREFERRED EMBODIMENTS

Figure 1:
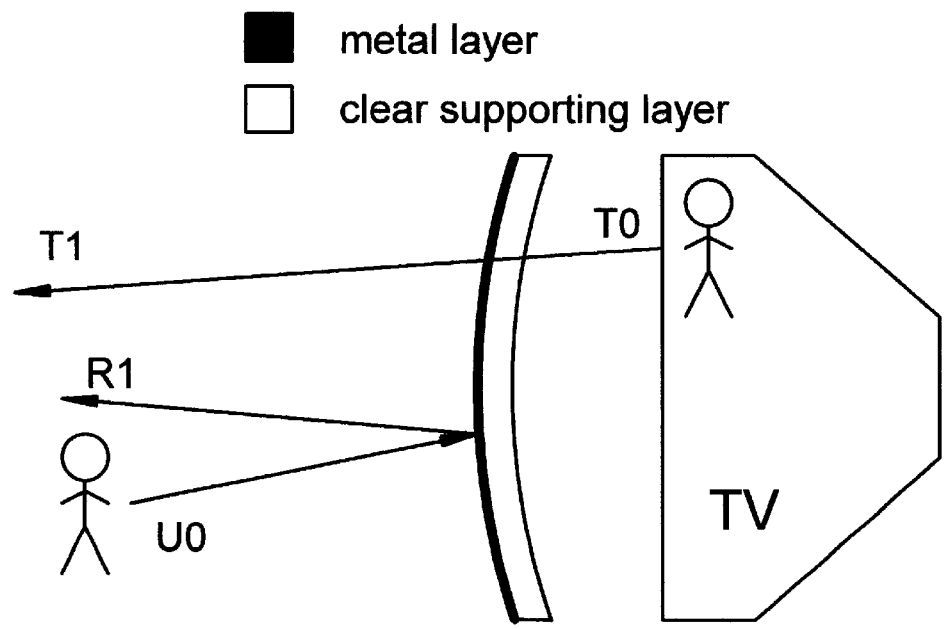
FIG. 1 is a schematic illustration showing the operation of the prior art device which allow a viewer to observe both the viewer's reflected image and a transmitted TV image (with the ghost effect and heating effect omitted for clarity)
Figure 2:
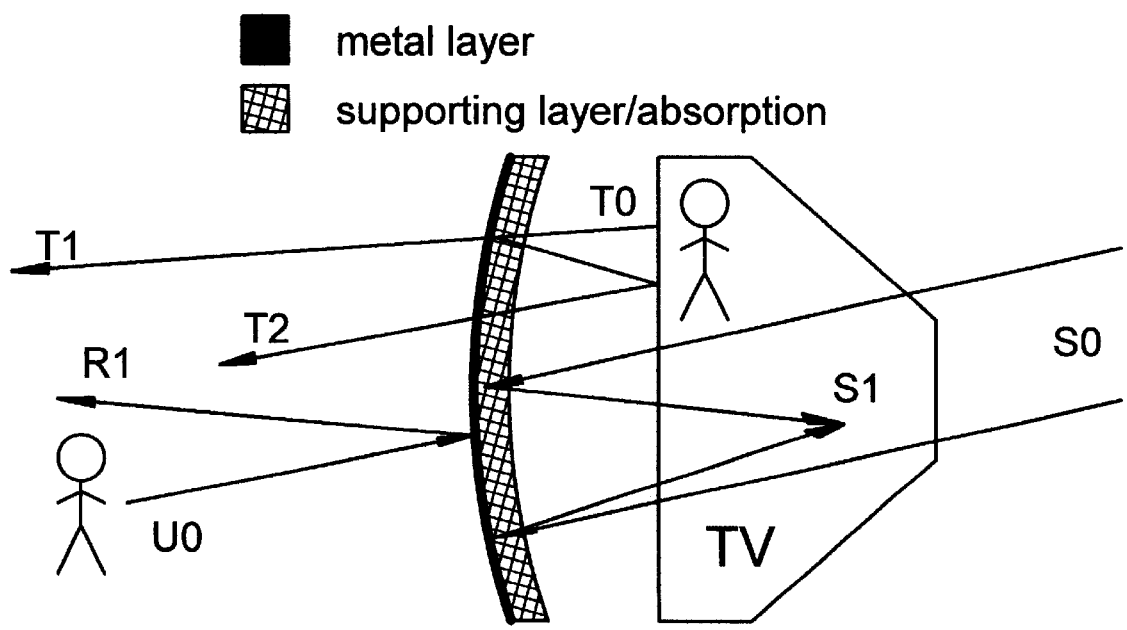
FIG. 2 is a schematic illustration showing the improved device of the present invention including the ghost effect and heating effect, which are suppressed.

At first, the incorporation of optical absorption in the supporting layer would not seem to be a desirable strategy since the intensity of the transmitted image, T1, would also be decreased. However, looking closely at FIG. 2, it can be seen that although the transmitted image passes through this supporting layer one time, both the ghost image and the heating effect image pass through the supporting layer multiple times. The ghost image passes through the supporting layer three times and the heating effect image passes through the supporting layer twice. Thus, for example, if the absorption in the supporting layer were made to be 50% for all relevant wavelengths, although the transmitted image would be reduced to 50% of its original intensity, the ghost image would be reduced to only 12.5% of its original intensity and the heating effect would be reduced to only 25% of its original intensity. In addition, this absorption allows a further improvement of these effects. The metal layer can now be decreased in thickness making the transmission higher and the reflection lower. This is done to rebalance the relative intensities between T1 and R1. The metal layer thickness can be decreased so that the ratio of T1 to R1 remains approximately the same as before the absorbing layer was added. This also further reduces the ghost image and heating effect by the same percentage as the percentage reduction in the reflection of the metal layer.

Table 1 shows an example of the typical performance improvement of the screen using this absorption layer technique. In Table 1, all of the measurements were made using a Gardner Model 96 Spectrophotometer over a wavelength of 380 to 720 nm. The values used for transmission and reflection are spectral values. The values reported for visible light are averages from 380 to 680 nm. In the absence of an infrared spectrometer, tests to indicate infrared response were done at high visible wavelengths. Thus, values for infrared are averages over 680 to 720 nm.

In the optical calculations the surface reflection of the plastic layers has been set to zero and optical interference effects have been ignored. Since both of these effects are small compared to the optical intensities which are being calculated, the resulting errors are small and do not effect the basic results. This was confirmed by the results of these test screens. The transmission, reflection and absorption values were taken to be their average value in the visible wavelengths. The solar heating effects were also calculated using these average values. The ratio of the brightness of the original TV image to the brightness of the user is set at 5.0 in recognition of the fact that in actual situations that have been checked, this is often close to their actual ratios. This also places the desirable value of R1/T1 at a value of 1.

The data for an actual screen with no absorbing plastic layer is shown in Section A of Table 1.

TABLE 1

Filter Performance for Illusion Apparatus screen measurements (intensities as fraction of total)

|  | transmission | reflection (convex side) | reflection (concave side) | absorption (calculated) |
|---|---|---|---|---|
| baseline screen | 0.134 | 0.734 | 0.704 | 0.162 |
| with new metal film | 0.245 | 0.538 | 0.508 | 0.247 |

| | plastic transmission | | assume (relative intensities) | |
|---|---|---|---|---|
| | | with absorption | U0: | 1 |
| clear | visible | infrared | T0: | 5 |
| 1 | 0.38 | 0.38 | | |

Section A

No absorption in plastic - baseline metal film (baseline configuration)

| | | | | | |
|---|---|---|---|---|---|
| | R1: | 0.73 | ratio R1/T1: | 1.10 | relative brightness of user image to TV image |
| | T1: | 1.67 | | | |
| ghost | T2: | 0.0189 | ratio T2/T1: | 0.028 | relative brightness of ghost TV image to TV Image |
| heat | S1/S0: | 0.70 | | | |

Section B

Absorption in plastic - baseline metal flim

| | | | | | |
|---|---|---|---|---|---|
| | R1: | 0.73 | ratio R1/T1: | 2.88 | relative brightness of user image to TV image |
| | T1: | 0.25 | | | |
| ghost | T2: | 0.0010 | ratio T2(B)/T2(A): | 0.05 | relative brightness of ghost TV image to TV Image |
| heat | S1/S0: | 0.10 | ratio S1(B)/S1(A): | 0.14 | relative brightness of ghost TV image to current ghost TV Image |

Section C

Absorption in plastic - redesigned metal film

| | | | | | |
|---|---|---|---|---|---|
| | R1: | 0.54 | ratio R1/T1: | 1.16 | relative brightness of user image to TV image |
| | T1: | 0.47 | | | |
| ghost | T2: | 0.0014 | ratio T2(B)/T2(A): | 0.072 | relative brightness of ghost TV image to current ghost TV Image |
| heat | S1/S0: | 0.07 | ratio S1(B)/S1(A): | 0.104 | relative new heating effect to current heating effect |

U0 = brightness of user
T0 = brightness of original TV image
T1 = brightness of transmited TV image
T2 = brightness of TV ghost image
R1 = brightness of user's image
S0 = brightness of solar source
S1 = brightness of reflected image of solar source The metal layer was designed with an average visible optical transmission of 13.4%. For its designed conditions of use the relative brightness of the user image to TV image (R1/T1) was made to be about 1. Section B shows the performance of a screen using this same metal coating but with an absorbing layer (38% transmission of the support layer). Although both the ghost image and heating effect have been substantially reduced, the R1/T1 ratio has been increased to a non-optimum value of 2.88 due to the dimming of the transmitted image. Section C shows the result of using this absorbing layer, but changing the metal film optical properties (by changing the thickness of the metal film so that its optical transmission is 24.5%) to change the relative brightness of the user image to TV image (R1/T1) back to the desirable ratio that it was in Section A. It can be seen that to the relative brightness of the ghost image and the intensity of heating effect have each been reduced to 7.2% and 10.4%, respectively, of their comparative values in Section A, while still maintaining the R1/T1 ratio to a near optimum value of 1.

There are a very wide variety of choices for both the plastic used for the screen and the dye used for the absorbing layer. Any optically transparent plastic with good structural and forming properties can be used. In the example cited here, PETG plastic, made by Eastman Chemical Co., Eastman Rd., Kingsport, Tenn. 37622, was used. There are also a large number of commercially available dyes which will work. The dye should be a transparent colorant for the plastic used and should be able to be added to the plastic in high enough concentrations to obtain the average absorption values needed to reduce the ghost image and the heating effect to the desirable levels for the particular application. In this example the dye used for the absorbing layer was made by Eastman Chemical Co., Eastman Rd., Kingsport, Tenn. 37662 and is their dye #14471 M0009. Their standard letdown ratio (mixing weight ratio of plastic to dye) of this plastic with this dye is 50:1. However, in order to obtain the desired average visible transmission of 38% (62% absorption), the letdown ratio was changed to 50:1.873 (or 27.70:1). Many other commercially available plastic/dye combinations would also work.

Thus, redesigning this screen for only 38% transmission of the support layer and 24.5% transmission of the metal layer has resulted in a decrease in the relative brightness of the ghost by a factor of 13.9 and a decrease by a factor of 9.6 in the intensity of the heating effect. The intensity ratio of the TV image to the reflected user image has remained constant. The absolute intensity of each of these images has only decreased by about 27%. There are, of course, many other possible combinations of values for the properties of the metal and supporting layer which can optimize this screen for a wide variety of special applications and non-standard viewing conditions.

It will also be apparent to one skilled in the art that this invention can be achieved by adding a light absorbing layer to the concave side of the screen rather than adding a dye to the support layer.

Generally, useful values of the optical transmission of the supporting layer may range from about 90% down to about 5%, corresponding to absorption in the range of from about 10% to 95%. The appropriate value for any particular situation will depend on such factors as the relative brightness of the original TV image and the viewer which forms the reflected image; the particular application, etc. Generally, brighter TV images and lower viewer brightness can support and require lower optical transmission (higher absorption). Conversely, dimmer TV images and higher viewer brightness will generally require higher optical transmission (lower absorption).

An additional benefit of adding an optically absorbing tint or dye to the supporting layer is the possibility of using it to color correct the TV image. The TV image in the original design is color shifted by the transmission through the metal layer which is not achromatic. The aluminum metal layer which was used in this example transmits a greater amount of visible light at the blue end of the spectrum (lower wavelengths) than at the red end of the spectrum. Thus the transmitted images have a slightly bluer overall color than the original image. The color of the supporting layer tint (the #14471 M0009 dye system) was selected partially because it transmits visible light more strongly in the red than in the blue and thereby tends to correct the metal film's color shift. Other dye systems are also available which have a similar absorption color. For example, mention may be made of the dyes commercially available from Eastman Chemical Co., under the designations #14471 M0020, #14471 M0039, #14471 M0049. Also suitable are the plastic dye systems commercially available from Ciba-Geigy, Newport, Del., such as, for example, Filester and Oracet dyes. These dyes may be used, for example, with ABS, PET and PPE plastics.

Finally, although the ghosting is obviously determined by the optical properties in the visible range of wavelengths, the heating effect is most affected by the optical properties in the infrared range of wavelengths. This is because a larger percentage of the energy of solar radiation is found at infrared wavelengths. Thus the heating effect (for solar radiation) can be further reduced by using an additional absorbing dye in the plastic supporting layer which only absorbs at infrared wavelengths. An added benefit of using an infrared absorbing dye is that the thickness of the metal layer does not have to be adjusted to compensate for its effect, since its absorption at visible wavelengths is low. There are many available commercial dyes for plastics which have high absorption at infrared wavelengths and have fairly low absorption in the visible wavelengths. An example of such a dye which could be used is Keysorb 911MN or Keysorb 979NM from Keystone Aniline Corp., Chicago, Ill.

The light absorbing transparent curved screens of this invention may be used in conjunction with a television display as in the aforementioned U.S. Pat. No. 4,971,312 or with the more recently developed training video method and display of the same inventor as described in U.S. Pat. No. 5,681,223.

What is claimed is:

1. A curved screen having a convex face and a concave face, the curved screen disposed with the concave face toward, and substantially covering, a display and the convex face toward a viewer of the display, wherein the curved screen is partially reflective and partially transparent and comprises a thin metal layer supported on the convex side of a transparent supporting layer, and wherein the supporting layer comprises light absorbing means.

2. The curved screen of claim 1, wherein the light absorbing means comprises a dye in the transparent supporting layer.

3. The curved screen of claim 2, wherein said transparent supporting layer further comprises a dye capable of absorbing substantially only light at infrared wavelengths.

4. The curved screen of claim 1, wherein the light absorbing means comprises a light absorbing layer applied to the concave face of the transparent supporting layer.

5. The curved screen of claim 1, wherein the light absorbing means is adapted to transmit a greater amount of visible light in the red region of the spectrum than in the blue region of the spectrum.

6. A curved screen comprising a thin metal layer supported on a transparent supporting layer, having a convex face and a concave face, adapted to be positioned between a viewer and a video display with the convex face toward the viewer, wherein the curved screen is partially reflective and partially transparent so as to form a composite image comprising a real-time reflected image of the viewer and a transmitted image from the video display, also comprising light absorbing means essentially concentric with the curved screen and on the concave side of the thin metal layer.

7. The curved screen of claim 6, wherein the light absorbing means is adapted to transmit a greater amount of visible light in the red region of the spectrum than in the blue region of the spectrum.

* * * * *